United States Patent [19]

Jao et al.

[11] Patent Number: 4,810,396
[45] Date of Patent: Mar. 7, 1989

[54] PROCESS FOR PREPARING OVERBASED CALCIUM SULFONATES

[75] Inventors: Tze-Chi Jao, Fishkill, N.Y.; William J. Powers, III, Port Arthur, Tex.

[73] Assignee: Texaco Inc., White Plains, N.Y.

[21] Appl. No.: 188,517

[22] Filed: Apr. 29, 1988

[51] Int. Cl.$^4$ .......................................... C10M 135/10
[52] U.S. Cl. ..................... 252/33; 252/33.2; 252/33.4; 252/25
[58] Field of Search ............... 252/33, 33.2, 33.4, 252/18, 25

[56] References Cited

U.S. PATENT DOCUMENTS

| | | | |
|---|---|---|---|
| 3,816,310 | 6/1974 | Hunt | 252/33.4 |
| 4,427,559 | 1/1984 | Whittle | 252/33.2 |
| 4,597,880 | 7/1986 | Eliades | 252/33.4 |
| 4,604,219 | 8/1986 | Whittle | 252/33.4 |
| 4,698,170 | 10/1987 | Le Coent | 252/33.2 |

*Primary Examiner*—Jacqueline V. Howard
*Attorney, Agent, or Firm*—Jack H. Park; Kenneth R. Priem; Richard A. Morgan

[57] ABSTRACT

In the preparation of an overbased calcium sulfonate, it has been found that charging calcium oxide and the total amount of water in amount of water of 20 to 25 mole % of the calcium oxide and a calcium oxide:calcium hydroxide ratio of 60:40 before carbonation improved feedstock utilization and reduced solids. Calcium hydroxide may be mixed with the calcium oxide through it takes no part in the water requirement.

6 Claims, No Drawings

PROCESS FOR PREPARING OVERBASED CALCIUM SULFONATES

BACKGROUND OF THE INVENTION

This invention is an improved process for preparing overbased calcium sulfonates which are used as detergent and reserve alkalinity lubricating oil additives.

DESCRIPTION OF OTHER RELEVANT METHODS IN THE FIELD

In the course of operation, internal combustion engines convert lubricating oil to acidic degradation products. Those acidic degradation products attack and corrode engine parts and catalyze the formation of sludge, thereby reducing lubricity and accelerating wear of moving parts in contact with the lubricating oil.

It is desirable to add basic substances to the lubricating oil which neutralize acids as they are formed in the engine before they reach concentrations sufficient to cause corrosion or to catalyze the sludge reaction. Adding an alkalinity agent to the detergent in motor oil is known as overbasing. Colloidal carbonates of the alkaline earth metals have been found to be well suited for this purpose. These carbonate dispersions are stabilized by oil soluble surface active agents with the sulfonates of the alkaline earth metals in which the sulfonic acid portion of the molecule has a molecular weight of preferably 450 to 600. The sulfonates are made by sulfonation of lubricating oil fractions from petroleum and by sulfonation of alkyl benzenes having the desired molecular weight for this purpose. Benzene alkylates with straight chain alkyl groups are especially desirable.

In general the process of preparing oils which contain overbased calcium sulfonates comprises reacting a solution of alkylbenzene sulfonic acids having a molecular weight greater than 400, in oil with calcium oxide or hydroxide and bubbling carbon dioxide through the reaction mixture; thereby incorporating an excess of calcium carbonate into the calcium sulfonate which confers reserve alkalinity to the product.

U.S. Pat. No. 4,427,559 to J. R. Whittle teaches that a mixture of calcium oxide and calcium hydroxide can be used in the overbasing reaction to provide reserve alkalinity to neutral calcium sulfonates. It is reported that when mixtures containing up to 30% CaO are used, satisfactory products were obtained. When mixtures of 30 to 50% CaO were used, a gelatinous material which plugged the filter were obtained. Concentrations of CaO above 70% produced a fluid product containing finely divided particles which could not be filtered and were reflective of light. In this regard the patent teaches the criticality of the ratio of the calcium oxide to calcium hydroxide in the absence of a promoter in producing acceptable products.

U.S. Pat. No. 4,604,219 to J. R. Whittle teaches that calcium oxide may be used as the sole reserve alkalinity source in overbasing calcium sulfonates. This patent teaches in the absence of a promoter, that water addition rate and amount are critical in producing a low solids content, filterable product.

U.S. Pat. No. 4,086,170 to De Clippeleir et al. teaches overbased calcium sulfonates are prepared by reacting a solution of alkylbenzene sulfonic acids with an excess of a calcium oxide having a medium or low activity toward water and with carbon dioxide. Improved overbasing and filterability of the overbased sulfonate solution were obtained by the use of a promoter for the conversion of the calcium oxide to calcium hydroxide. Recommended promoters include ammonia or organic bases such as monoamines or diamines, e.g. ethylene diamine.

SUMMARY OF THE INVENTION

The invention is an improved process for preparing an overbased calcium sulfonate. Calcium sulfonates are overbased by diluting a neutral calcium sulfonate with a light hydrocarbon solvent and a lower alkanol. Next, calcium oxide and the total charge of water is added in an amount of 15 to 30 mole %, preferably 20 to 25 mole % of the calcium oxide to be added. The calcium oxide is added as a mixture with calcium hydroxide wherein the calcium oxide is 80 mole % to 40 mole %, preferably 65 mole % to 55 mole %. Calcium hydroxide is fully hydrated and is not accounted for in the addition of water. The admixture is then heated to about 100° F. to 170° F. at 0 to 50 psig and carbonated for 1 to 4 hours. A diluent oil is then added and the admixture filtered to remove solids. The liquid is stripped of solvent and the resulting liquid product recovered.

DESCRIPTION OF THE PREFERRED EMBODIMENTS

The invention is an improvement in U.S. patent. application Ser. No. 07/129,618 filed Dec. 12, 1987 for a Method of Preparing Overbased Calcium Sulfonates to Tze-chi Jao.

A process for overbasing calcium sulfonates has been discovered based on the use of a mixture of calcium oxide and calcium hydroxide in specified proportion as the source of inorganic calcium. The entire charge of water is added before the carbonation in an amount of 15 to 30 mole % of the calcium oxide. A clear product with a low solid waste is produced.

It is known to produce overbased sulfonates by means of calcium oxide alone or a mixture of calcium oxide and calcium hydroxide. Overbased sulfonates produced from calcium oxide-calcium hydroxide mixtures are noted for a hazy product with a relatively low level of overbasing. The instant invention is distinguished in the recognition that calcium oxide:calcium hydroxide ratio is essential to produce a clear, low solids content mixture for filtering.

The use of calcium hydroxide alone is undesirable because it typically produces a high solids content product and demonstrates low sulfonate utilization. Applicant's Ser. No. 07/129,618 filed Dec. 7, 1987 achieved an improvement in using calcium oxide alone. This process produced a clear product containing only amorphous calcium carbonate and a higher sulfonate utilization. The instant process is distinguished from Ser. No. 07/129,618 by a simplified process scheme while demonstrating equivalent sulfonate utilization and low solids content.

The operating parameters of the present process are tabulated in Table I.

TABLE I

| Variable | Operable Range | Preferred Range |
|---|---|---|
| 1. Reaction Temperature | 100° to 170° F. | 130° to 150° F. |
| 2. Pressure | 1 to 5 atm. | 1 to 2.5 atm. |
| 3. Mole ratio CaO:Ca(OH)$_2$ | 80:20 to 40:60 | 65:35 to 55:45 |
| 4. Mole ratio H$_2$O/CaO | 0.15 to 0.30 | 0.20 to 0.25 |
| 5. Mole ratio CO$_2$/CaO + Ca(OH)$_2$ | 0.1 to 1.2 | 0.6 to 0.9 |

TABLE I-continued

| Variable | Operable Range | Preferred Range |
| --- | --- | --- |
| 6. Hydrocarbon Solvent | 37 to 60 wt % | 40 to 55 wt % |
| 7. Alcohol | 4.7 to 7.2 wt % | 4.8 to 5.8 wt % |
| 8. Carbonation and Hydration Time | 60 to 240 min. | 60 to 180 min. |

Examples of useful and preferred reactants which may be employed in the practice of the invention are listed in Table II.

TABLE II

| Reactants | Example | Preferred Reactants |
| --- | --- | --- |
| 1. Calcium Oxide | | One with a total slaking time of 4.5–35 minutes and a temperature rise of 6° C. max in the first 30 sec. as measured by ASTM C-100-76a. |
| 2. Calcium Sulfonate | Neutralized sulfonic acid derived from a natural feedstock. Neutralized sulfonic acid derived from a synthetic feedstock. Blends of neutralized sulfonic acids from natural and synthetic feedstocks. | Blends of neutralized sulfonic acids from natural and synthetic feedstocks. |
| 3. Diluent Oil | 100–500 SUS (@ 40° C.) pale stock. 100–500 SUS solvent neutral oil. | 100 SUS pale stock hydro-finished |
| 4. Hydrocarbon Solvent | Straight run gasoline, dehexanized raffinate gasoline, normal or mixed hexanes, normal or mixed heptanes, benzene or toluene. | Crude heptane |
| 5. Lower alcohols | $C_1$–$C_5$ normal or branched chain alcohols. | Methanol |

This invention is better shown by way of example.

EXAMPLE I

Glassware Synthesis

A blend containing 32 parts by weight of a neutral calcium sulfonate, 91 parts heptane, 8 parts methanol, 10.6 parts calcium oxide and 9.3 parts calcium hydroxide was brought to reflux at 60° C. in a 500 ml reaction flask. The resultant mixture was refluxed for 10 minutes. Water, 0.7 parts was added immediately before $CO_2$ charge. $CO_2$ was then introduced into the reaction mixture at a rate of 40 ml/min. The $CO_2$ treatment was stopped after 135 minutes. Then 10 parts of pale oil was added and stirred for 10 minutes.

The filtered and solvent-stripped final product had a TBN value of about 400. Its IR spectrum showed a symmetric band at a frequency of 865 cm(-1), indicating amorphous calcium carbonate. The volume of solid waste in the crude product was about 11% to 15%.

EXAMPLE II

The procedure of Example I was repeated. The following results were recorded:

| Mole ratio water/calcium oxide | Kinematic viscosity of final product at 100° C. (cst) | Filtration time of 50 ml crude product (minutes) |
| --- | --- | --- |
| 1. 0.30 | 134 | 27 |
| 2. 0.235 | 186 | 9 |
| 3. 0.17 | 2337 | 3 |
| 4. 0.10 | gel | — |

EXAMPLE III

Pilot Plant Synthesis

A blend containing 11.8 parts by weight neutral calcium sulfonate, 32 parts crude heptane, 2.83 parts methanol, 3.8 parts calcium oxide and 3.3 parts calcium hydroxide was heated to 40° C. in a 10-gallon reactor. Water, 0.24 part, was added. The reaction mixture was then brought to reflux at 60° C. $CO_2$ was introduced into the reaction mixture at a rate of 5.33 liter/min as soon as the reaction mixture reached the reflux temperature. The $CO_2$ treatment was stopped after 165 minutes. Then 5.6 parts pale oil was added and stirred for an additional 10 minutes.

The filtered and solvent stripped final product had a TBN value of 398. Its IR spectrum showed a symmetric band with a frequency of 865 cm(-1) indicating amorphous calcium carbonate. The lime utilization was 86% and sulfonate utilization was 100%, while the solid volume in the crude product was about 13%. In a comparable commercial calcium hydroxide process under the same conditions, lime utilization was 60% and sulfonate utilization was 84%, while the solid volume in the crude product was about 40 to 50%.

GLOSSARY $$TBN - \text{Total Base Number} = \frac{\text{milligrams KOH}}{\text{gram sample}}$$

TBN; ranging from 0 to 400, is the measure of the overbasing of 10 to 40 wt % calcium sulfonate with 0 to 50 wt % CaO, $Ca(OH)_2$, $CaCO_3$ or mixture thereof.

While particular embodiments of the invention have been described, it will be understood, of course, that the invention is not limited thereto since many modifications may be made, and it is, therefore, contemplated to cover by the appended claims any such modifications as fall within the true spirit and scope of the invention.

What is claimed is:

1. A process for preparing an overbased oil-soluble calcium sulfonate comprising in order:
   (a) diluting a neutral calcium sulfonate with a light hydrocarbon solvent and a lower alkanol;

(b) adding all calcium hydroxide, calcium oxide and water in a molar ratio of calcium oxide:calcium hydroxide of 80:20 to 40:60 and a molar ratio of water:calcium oxide of 0.15:1 to 0.30:1;
(c) heating the resulting mixture to about 100° F. to 170° F. at pressure of about 0 to 50 psig;
(d) introducing carbon dioxide over a time of about 60 to 240 minutes into the heated mixture;
(e) adding a diluent oil;
(f) separating solids from the liquid; and
(g) stripping the solvent from the resulting liquid product.

2. The process of claim 1 wherein the mole ratio of water:calcium oxide is 0.2:1 to 0.3:1.

3. The process of claim 1 wherein the mole ratio of calcium oxide:calcium hydroxide is about 65:35 to 55:45.

4. The proces of claim 1 wherein the light hydrocarbon solvent is heptane.

5. The process of claim 1 wherein the lower alkanol is methanol.

6. The process of claim 1 wherein the time of introducing carbon dioxide is 60 to 180 minutes.

* * * * *